Nov. 13, 1923.

H. B. GARMAN

DUSTGUARD FOR DRAG LINKS

Filed Dec. 14, 1921   2 Sheets-Sheet 1

1,473,931

INVENTOR:
HARRY B. GARMAN
BY
*(signature)*
ATTORNEY

Nov. 13, 1923.
H. B. GARMAN
1,473,931
DUSTGUARD FOR DRAG LINKS
Filed Dec. 14, 1921     2 Sheets-Sheet 2
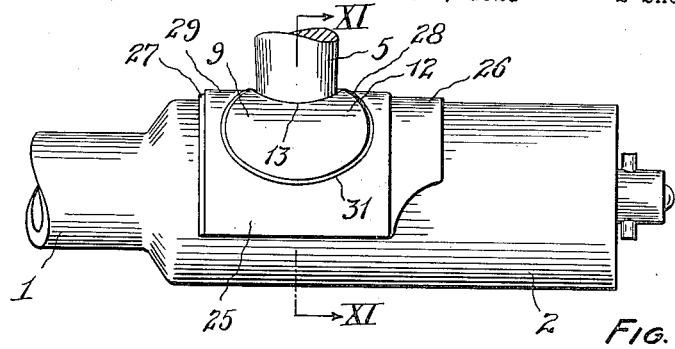
FIG. 10.
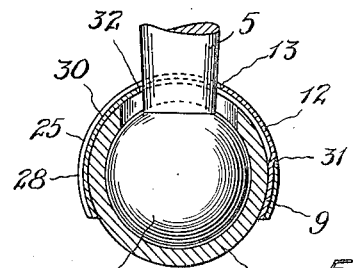
FIG. 11.
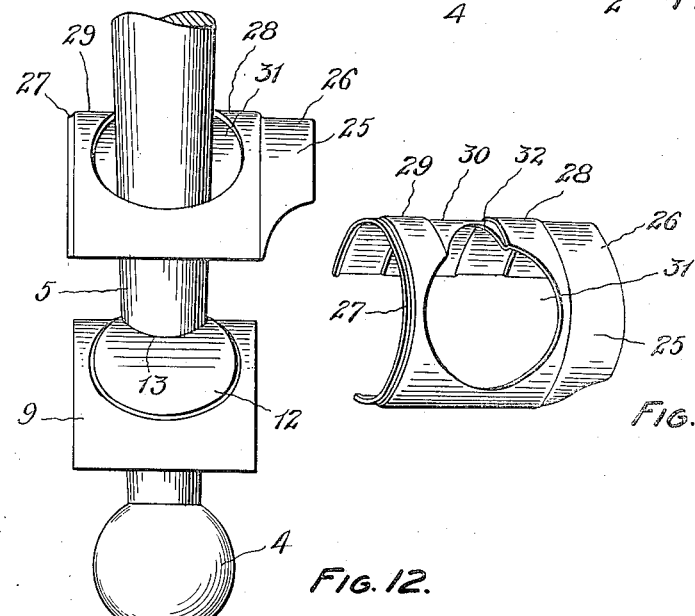
FIG. 12.     FIG. 13.
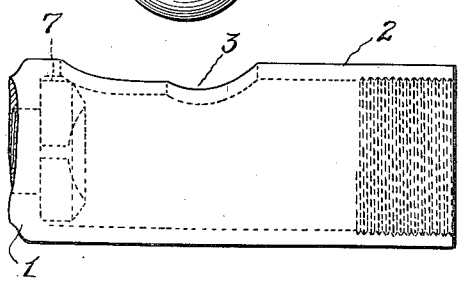
INVENTOR:
HARRY B. GARMAN
BY
ATTORNEY Patented Nov. 13, 1923.

1,473,931

UNITED STATES PATENT OFFICE.

HARRY B. GARMAN, OF DETROIT, MICHIGAN, ASSIGNOR TO THE STEEL PRODUCTS COMPANY, OF CLEVELAND, OHIO, A CORPORATION OF OHIO.

DUSTGUARD FOR DRAG LINKS.

Application filed December 14, 1921. Serial No. 522,377.

*To all whom it may concern:*

Be it known that I, HARRY B. GARMAN, a citizen of the United States, resident of Detroit, county of Wayne, and State of Michigan, have invented new and useful Improvements in Dustguards for Drag Links, of which the following is a specification, the principle of the invention being herein explained and the best mode in which I have contemplated applying that principle, so as to distinguish it from other inventions.

This invention relates to dust guards for drag links forming a part of the steering mechanism of an automobile, and has for an object to provide readily detachable coverings for the slots in the end sockets through which the steering and axle arms pass. A further object is to provide a covering member or dust cap which can be quickly attached or detached, which does not interfere with the pivotal movement of the arm in the socket and which fits snugly about the arm and over the socket to prevent entrance of dust and dirt to the joint.

The annexed drawings and following description set forth in detail certain means embodying my invention, the disclosed means, however, constituting but two of the various mechanical forms in which the principle of the invention may be employed.

Figure 3:
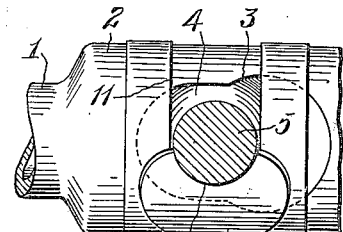
Fig. 3 is a fragmentary plan view of an end socket showing the inner clip, only, in place thereon.
Figure 1:
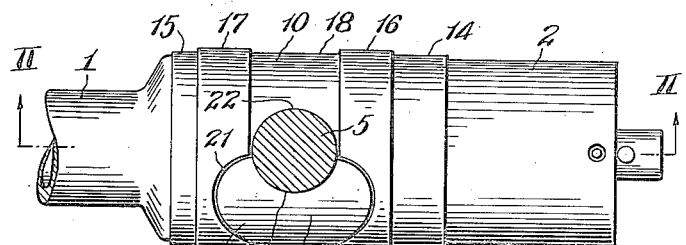
Fig. 1 is a plan view of one of the end sockets showing the improved dust cap in place thereon.
Figure 4:
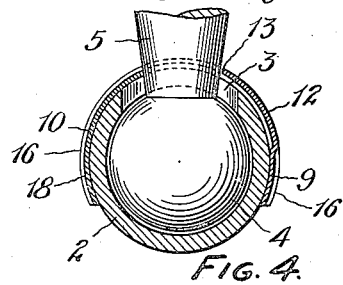
Fig. 4 is a sectional view taken on the plane indicated by line IV—IV of Fig. 2.
Figure 2:
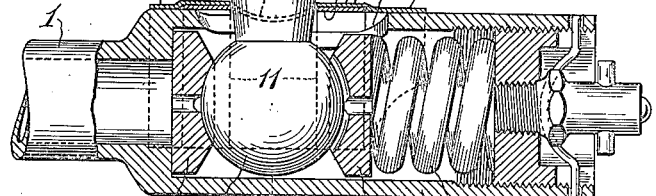
Fig. 2 is a sectional view taken on the plane indicated by line II—II of Fig. 1.
Figure 6:
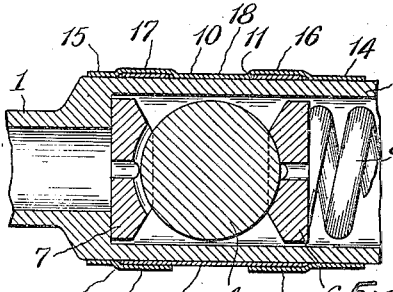
Fig. 6 is a sectional view taken on the plane indicated by line VI—VI of Fig. 5.
Figure 5:
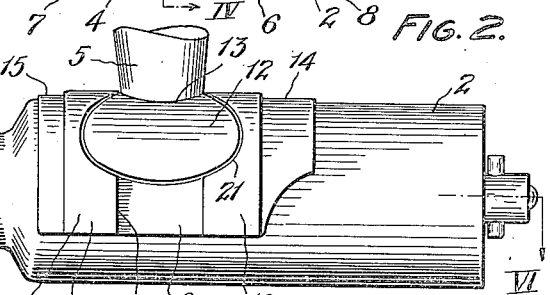
Fig. 5 is a side elevation of an end socket showing the dust cap in place thereon.
Figure 7:
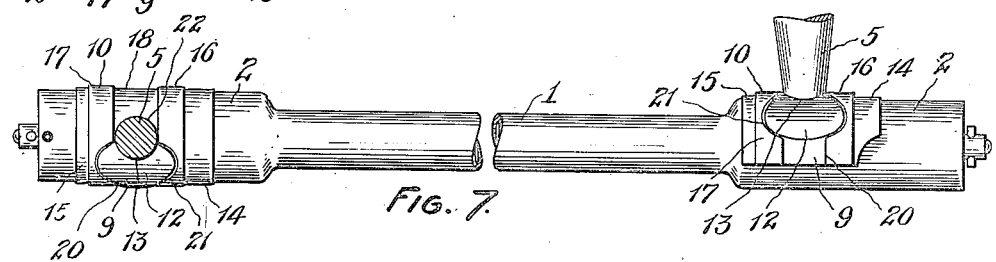
Fig. 7 is a side elevation on a reduced scale showing a complete drag link with the improved dust cap in place on both end sockets thereof.
Figure 8:
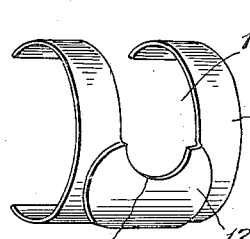
Figs. 8 and 9 are perspective views of the inner and outer sheet metal clips, respectively, which together comprise the improved dust cap.
Figure 9:
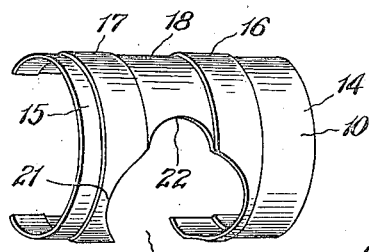

Figs. 10 to 13 inclusive, show a modification in which it is necessary to disconnect the ball arm from the socket in order to remove the dust cap.

Fig. 10 is a side elevation of an end socket with the modified dust cap in place thereon.

Fig. 11 is a sectional view taken on the plane indicated by line XI—XI of Fig. 10.

Fig. 12 is a view showing the manner in which the parts are assembled.

Fig. 13 is a perspective view of the modified outer dust cap.

Referring to the annexed drawings in which like reference numerals indicate the same parts throughout, the drag link consists of a piece of tubing 1 having expanded ends 2, forming end sockets. Each socket 2 has an elongated keyhole slot 3 through which the ball end 4 of a connecting arm 5 is inserted into the socket. The ball end 4 is journaled between bearing blocks 6 and 7 one of which is positioned against a fixed seat and the other of which is yieldingly pressed against the ball end 4 by a coil spring 8. The arm 5 is held by the bearing members in the restricted portion of the keyhole slot 3 the width of which is less than the diameter of the ball end 4.

To effectually seal the joint to prevent entrance of dust or other foreign matter thereto, I have provided a dust cap consisting of an inner sheet metal clip 9 and an outer sheet metal clip 10.

The inner clip 9 consists of a strip of sheet metal bent into cylindrical form and adapted to fit snugly over the socket 2 through slightly more than 180 degrees. The clip 9 has a slot 11 extending from one edge thereof circumferentially through slightly more than half the circumferential extent of the clip. A circular boss 12 is formed in the body of the inner clip 9 adjacent the inner end of the slot 11. The inner end of the slot 11 terminates in a semicircular seat 13 cut into the boss 12. The width of the slot 11 and the diameter of the semicircular seat 13 correspond to the outer diameter of the arm 5 so that the clip 9 can be sprung over the socket 2 with the semicircular seat 13 in engagement with the arm 5 as shown in Fig. 3. The outer clip 10 consists of a strip of sheet metal bent into cylindrical form slightly wider than the strip 9 and adapted to be sprung in place on top of the strip 9. The clip 10 has edge portions 14 and 15 extending beyond the ends of the inner clip 9 and adapted to fit snugly upon the surface of the socket 2. Circumferential bosses 16 and 17 provide internal grooves fitting over the edge portions of the clip 9 at the sides of the slot 11. Between the bosses 16 and 17 a central depressed portion 18 fits snugly against the surface of the cylindrical socket within the slot 11 of the clip 9. The clip 10 has a slot 20 extending circumferentially from one edge and of a width at the entrance portion thereof substantially equal to the diameter of the arm 5. The slot 20 has an enlarged circular portion 21 adapted to fit over the boss 12 of the clip 9 and a semicircular seat 22 corresponding to the seat 13 in the clip 9. When the clip 10 is sprung in place on top the clip 9 the arm 10 is held in the circular opening provided by the seats 13 and 22 in the two clips, the slot 11 beyond the arm 5 is closed by the depressed portion 18 of the clip 10, and the enlarged portion 21 of the slot 20 is closed by the boss 12 of the clip 9. The bosses 16 and 17 prevent relative longitudinal movement of the inner and outer clips and serve to guide the clip 10 into place as it is sprung on the clip 9. The boss 12 engaging in the enlarged portion 21 of the slot 20 provides a further lock against relative longitudinal movement and also locks the two clips against relative circumferential movement. The socket member 2 is snugly engaged throughout the extent of the dust cap and the cap as a whole is free to move longitudinally or circumferentially on the socket during the pivotal movement of the arm 5.

In the modified form shown in Figs. 10 to 13 inclusive, the inner clip 9 is exactly the same as in the form first described. The outer clip 25, however, is somewhat differently constructed. The clip 25 consists of a strip of sheet metal bent into cylindrical form slightly wider than the strip 9 and adapted to be sprung in place on top of the strip 9. The clip 25 has edge portions 26 and 27, corresponding to the edge portions 14 and 15 of the clip 10 in the modification first described, extending beyond the ends of the inner clip 9 and adapted to fit snugly upon the surface of the socket 2. The portion 27 extends only a short distance beyond the edge of the inner clip 9 so that the inner edge of the guard cannot project beyond the shoulder of the socket 2 on pivotal movement of the arm 5. Circumferential bosses 28 and 29, corresponding to the bosses 16 and 17 of the clip 10, provide internal grooves fitting over the edge portions of the clip 9 at the side of the slot 11. Between the bosses 28 and 29 a central depressed portion 30, corresponding to the depressed portion 18 in the clip 10, fits snugly against the surface of the cylindrical socket within the slot 11 of the clip 9. Just at one side, circumferentially of the center thereof, the clip 25 is provided with a circular opening 31 adapted to receive the ball end 4 of the arm 5 and to fit over the circular boss 12 on the clip 9. At the inner side of the opening 31 and extending into the depressed portion 30 of the clip is a semicircular seat 32 complemental to the seat 13 in the clip 9 and coacting therewith to enclose the arm 5 in the same manner as the seat 22 in the clip 10.

In assembling the joint as indicated in Fig. 12 the ball end 4 of the arm 5 is first slipped through the opening 31 in the clip 25, the clip 9 is positioned on the arm 5 below the clip 25, the ball is inserted in the slot 3 of the socket 2 and the clip 30 is then brought down on top of the clip 9 and both are sprung over the cylindrical socket 2.

What I claim is:

1. The combination with a drag link having a cylindrical socket with an elongated slot therein; of a connecting arm extending into said slot and journaled in said socket; and a dust cap comprising an inner sheet metal clip formed to fit said cylindrical socket throughout more than half the periphery thereof, and having a slot extending circumferentially more than 90 degrees, and an outer clip having a complemental slot therein, said outer clip being wider than said inner clip and provided with depressed end portions adapted to engage said socket beyond the ends of the inner clip, and a central depressed portion adapted to fit in the slot of said inner member, the inner ends of the slots in said clips being adapted to fit about said connecting arm.

2. The combination with a drag link having a cylindrical socket member with an elongated slot therein; of a connecting arm extending into said slot and journaled in said socket; and a dust cap comprising inner and outer sheet metal clips having a cylindrical contour and adapted to be sprung over said socket, said clips having oppositely disposed slots adapted to receive said arm, one of said slots having an enlarged portion, and a boss on the other of said clips adapted to be received in said enlarged portion of said slot.

Signed by me this 9th day of November, 1921.

HARRY B. GARMAN.